(No Model.)

F. W. WIESEBROCK.
INHALER.

No. 437,070.        Patented Sept. 23, 1890.

Witnesses.
Robt Ewitt,
J. A. Rutherford

Inventor.
Frederick W. Wiesebrock.
By James L. Norris
Atty.

UNITED STATES PATENT OFFICE.

FREDERICK W. WIESEBROCK, OF NEW YORK, N. Y.

INHALER.

SPECIFICATION forming part of Letters Patent No. 437,070, dated September 23, 1890.

Application filed May 24, 1890. Serial No. 353,093. (No model.)

*To all whom it may concern:*

Be it known that I, FREDERICK W. WIESEBROCK, a citizen of the United States, residing at New York, in the county of New York and State of New York, have invented new and useful Improvements in Inhalers, of which the following is a specification.

My invention has for its purpose to provide an apparatus for inhalation, whereby pure atmospheric air may be administered to persons suffering from pulmonary diseases, and whereby, also, any volatile remedial agent or substance may be easily volatilized or evaporated, as the case may be, and inhaled together with pure filtered air at any temperature desired.

It is my further purpose to combine with an apparatus of this kind a Bunsen or other burner, whereby the chamber into which the purified air is led may also afford means for the volatilization of whatever medicament is to be administered.

It is my further purpose to provide an apparatus for these uses which shall be simple, durable, and strong, which shall be easily cleaned, and which may be made of such simple construction as to bring it within the reach of persons of moderate means.

To these ends my invention consists in the several novel features of construction and new combinations of parts, hereinafter fully set forth, and then definitely pointed out in the claims following this specification.

To enable others skilled in the art to practice my said invention, I will proceed to describe the same in detail, reference being had to the accompanying drawings, in which—

Figure 1:
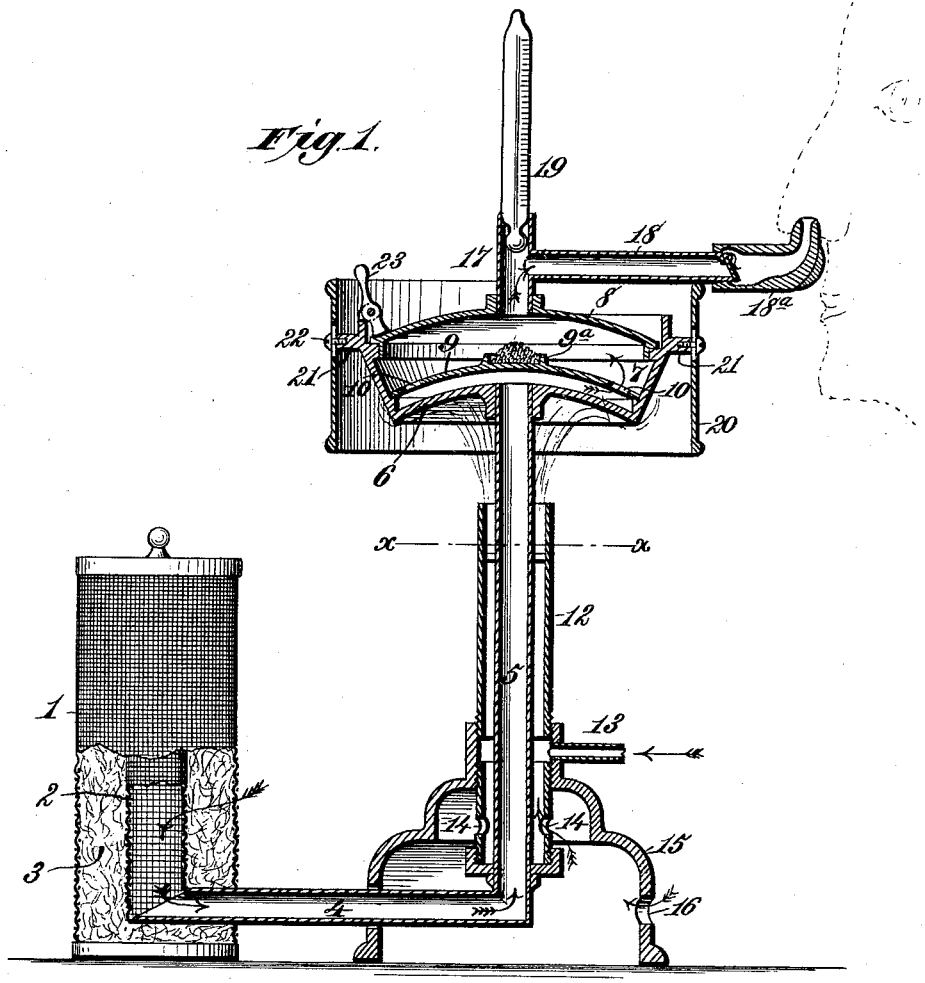
Figure 2:
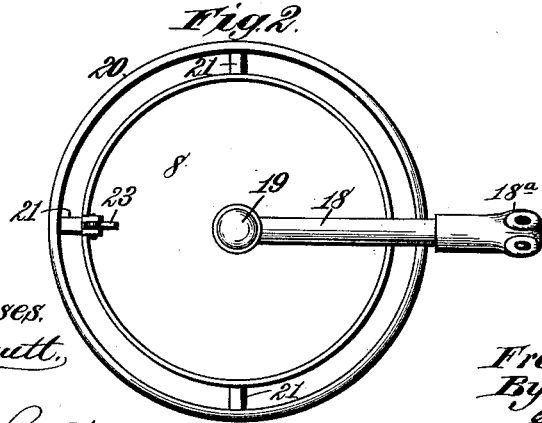
Figure 3:

Figure 1 is a sectional elevation showing the entire apparatus. Fig. 2 is a plan view of the same with the filter omitted. Fig. 3 is a transverse section upon the line $x\,x$, Fig. 1.

In the said drawings, the reference-numeral 1 designates an air-filter consisting of a cylinder of wire-gauze 2, surrounded concentrically by a second and larger cylinder of similar material, the annular space between the two being filled with any suitable fibrous material 3, which will act as a strainer for the air passing through and entering the inner tube. At its lower end this inner cylinder 2 is connected with a horizontal section of tubing 4, which in turn forms part of a vertical pipe 5, which is extended upward for some distance above the filter, and at its top enters a concave circular plate 6. This plate forms the bottom of a concavo-convex heating-chamber 7, which is closed at its top by a cover 8.

A little above the bottom 6 is arranged a plate 9, which forms the false bottom of the chamber 7, the tube 5 communicating with the space between the true and the false bottom.

In the false bottom 9 I form any desired number of air-openings 10, situated at or near the periphery of the same, in order to compel the air passing through the filter and thence through the pipes 4 and 5 to flow from the center to the space inclosed by the true and false bottoms, and pass radially outward for a reason now to be explained.

Surrounding the vertical pipe 5 concentrically is a tube 12, supported by radial arms, said tube extending upward to a point somewhat below the heating-bottom 6. Near its lower end a gas-pipe 13 enters this outer pipe 12, and a short distance below the same one or more air-openings 14 are formed in the said pipe 12, and preferably in that portion of the tube which lies within the base 15, which is supplied with one or more air-openings 16 to admit air to the air-openings in the tube 12. This constitutes a Bunsen burner in all material respects.

Within the heating-chamber 7 and upon the convex face of the false bottom 9 is formed a central cup or other containing device $9^a$, within which is placed any substance which is to be mingled with the filtered air in a volatile state and inhaled.

Rising centrally from the cover of the heating vessel or chamber is an inhalation-pipe 17, having a branch 18, extending to a suitable point beyond the periphery of the heating-chamber, its end being provided with either a double respirator $18^a$ for the nostrils or a single one for the mouth. The inhalation-pipe 17 is extended above the point of engagement with the branch pipe 18, and within the end of the extension is inserted the bulb of a thermometer 19.

The manner of using the inhaler is as follows: The substance to be volatilized is placed in the cup $9^a$, and the gas, being admitted to the annular space between the vertical pipe 5 and the concentric outer pipe already described, flows to the top of the latter tube, where it is ignited. The air drawn in by the ascending current is mingled with the gas, and a large part of the products of combustion are consumed, while the heat is directed against the concave face of the false bottom 6.

In order to protect the patient from any uncomfortable degree of heat during the period of inhalation, a circular shield 20 is suspended from arms 21, its lower edge dropping to any suitable point below the lower part of the heating-chamber. This shield may be rendered adjustable vertically by means of screws 22, tapped into the ends of radial brackets 21, which project from the upper and outer portion of the circumferential wall of the heating-chamber. Upon one or more of these brackets I may mount cam-locks 23, by which the cover of the heating-chamber may be fastened tightly.

By this invention the air is filtered and thoroughly purified before heating, whereby the disagreeable odors and taste, as well as the injurious effects of inhaling impure heated air, are entirely avoided. Moreover, I effect a marked economy in the consumption of gas by applying the heat directly below the surface of the bottom while the air is compelled to travel over the latter. It may also be noted that as the gas-jacket of the Bunsen burner terminates some distance below the false bottom the air receives a considerable degree of heat before entering the space between the false and the true bottom.

A check-valve may be and preferably is inserted in the hard-rubber mouth-piece or respirator.

I also secure a far more perfect result as regards the purity of the air by drawing it from a point below the point of combustion of the heater, thereby avoiding all contamination of the air by the fire-gases.

Another important feature of my invention is that I am able to charge the purified heated air with any volatile medium, as already described.

What I claim is—

1. In an inhalation apparatus, the combination, with an air-filter, of a heating-chamber, the bottom thereof being provided with a receptacle for a volatile medium, a pipe connecting the filter with the heating-chamber, and a pipe through which the commingled air and volatilized vapor may be inhaled, substantially as described.

2. In an inhalation apparatus, the combination, with an air-filter, of a heating-chamber arranged upon a higher plane, an air-tube connecting the filter with said chamber, the latter being provided with a true and a false bottom, between which the air enters and passes to openings in the false bottom, which is provided with a receptacle for a volatile medium, a gas-pipe surrounding the air-pipe and having air-openings, and an inhalation-pipe entering the top of the heating-chamber, substantially as described.

3. In an inhalation apparatus, the combination, with an air-filter, of a heating-chamber, a pipe connecting the two, a burner formed by a pipe surrounding the air-pipe leading to said chamber and having both gas and air inlets, an inhalation-pipe entering the top of said heating-chamber and having an extension containing a thermometer, and a circular shield adjustable vertically, substantially as described.

4. In an inhalation apparatus, the combination, with an air-filter composed of two concentric cylinders of wire-gauze having the annular space between them filled with a suitable fibrous material, of an air-pipe communicating with the inner cylinder and thence carried above the filter, a Bunsen burner surrounding the pipe, an air-heating chamber consisting of a vessel having an outwardly-concave true bottom and an inward false bottom, the air-pipe communicating with the space between the two, and the true bottom being provided with air-openings at or near its periphery, and an inhalation-pipe rising from the top of the chamber and having a branch provided with a suitable respirator, said inhalation-pipe being extended upward to receive the bulb of a thermometer, substantially as described.

In testimony whereof I hereunto affix my signature in presence of two witnesses.

FREDERICK W. WIESEBROCK.

Witnesses:
ROBT. M. JOHNSTON,
A. L. TRAVIS.